United States Patent [19]

Markovs

[11] 4,314,038
[45] Feb. 2, 1982

[54] GRAFT POLYOL RIM SYSTEM POSSESSING EXCELLENT THERMAL PROPERTIES

[75] Inventor: Robert A. Markovs, Canton, Mich.

[73] Assignee: BASF Wyandotte Corporation, Wyandotte, Mich.

[21] Appl. No.: 248,882

[22] Filed: Mar. 30, 1981

[51] Int. Cl.³ .............................................. C08G 18/14
[52] U.S. Cl. .................................. 521/167; 521/173; 521/176; 528/903
[58] Field of Search ....................... 521/167, 173, 176; 528/903

[56] References Cited

U.S. PATENT DOCUMENTS

| | | | |
|---|---|---|---|
| 3,476,710 | 11/1969 | Altscher et al. | 528/903 |
| 3,772,221 | 11/1973 | Hostettler et al. | 528/903 |
| 3,892,691 | 7/1975 | White et al. | 521/176 |
| 4,102,833 | 7/1978 | Salisbury | 521/176 |
| 4,243,760 | 1/1981 | McDaniel et al. | 521/176 |

OTHER PUBLICATIONS

Frisch et al. (Ed), Advances in Urethane Science & Technology, vol. 4, Technomic, Westport, Conn., 1976, pp. 132–165.

*Primary Examiner*—Maurice J. Welsh
*Attorney, Agent, or Firm*—Norbert N. Lisicki

[57] ABSTRACT

A thermal dimensionally stable RIM polyurethane elastomer prepared by reacting an organic polyisocyanate, a polyoxyalkylene polyether polyol, and ethylene glycol wherein the reactants have a free-water content of less than 0.10 percent based on 100 parts of polyol plus glycol.

10 Claims, 3 Drawing Figures

GRAFT POLYOL RIM SYSTEM POSSESSING EXCELLENT THERMAL PROPERTIES

BACKGROUND OF THE INVENTION

1. Field of the Invention

This invention relates to the preparation of reaction injection molded polyurethane elastomer. It more particularly relates to the preparation of reaction injection molded polyurethane elastomers which have improved thermal dimensionally stable characteristics.

2. Description of the Prior Art

The automotive industry is faced with legislative mandates which require improved fuel economy standards. In order to achieve these higher fuel economy goals, the automotive industry has downsized large vehicles. Furthermore, the automotive industry has investigated the use of lower weight materials. Among the types of materials which may be employed are those produced by reaction injection molded polyurethanes. In order for these products to meet the demanding requirements for their application, they must be sufficiently rigid to be self supporting, have thermal dimensional stability to allow for normal processing operations at elevated temperatures, have low coefficients of thermal expansion, have a class A surface and good paintability, and enjoy good impact characteristics at low temperatures. Low coefficients of thermal expansion may also be improved by the addition of milled glass fibers to the polyurethane matrix. Further, in order to enjoy the required thermal dimensional stability to allow the processor to, for example, paint at elevated temperatures, the urethane products must pass a heat sag test in the neighborhood of 165° C. in order to be practical for use in the painting applications as practiced by the automotive industry.

The reaction injection molded polyurethanes of the instant invention are generally prepared by reacting a mixture of polyoxyalkylene polyether polyol with various polyisocyanates and incorporating therein chain extenders such as ethylene glycol and/or butanediol while maintaining a low free water content prior to annealing of the elastomer.

U.S. Pat. No. 3,892,691 teaches the preparation of polyurethane products employing quasi prepolymers of diphenylmethanediisocyanate and dipropylene glycols together with a polypropylene ether triol such as is prepared by the reaction of ethylene and propylene oxide with trimethylolpropane or glycerol and the use of the chain extender 1,4-butanediol.

U.S. Pat. No. 4,243,760 teaches the preparation of reaction injection molded polyurethane products by employing chain extending agents such as ethylene glycol, propylene glycol and 1,4-butanediol.

U.S. Pat. No. 4,102,833 also teaches the preparation of reaction injection molded urethanes by employing long chain polyols together with a short chain diol or triol such as ethylene glycol or glycerol.

None of the prior art, however, recognizes the necessity for preparing and maintaining a very low free-water content in the resultant elastomer prior to annealing of the elastomer at elevated temperatures in order to obtain thermal dimensional stability.

SUMMARY OF THE INVENTION

This invention comprises reaction injection molded (RIM) polyurethane elastomers having improved thermal dimensionally stable characteristics comprising the reaction product of an organic polyisocyanate, a polyoxyalkylene polyether polyol, optionally a blowing agent, and ethylene glycol as the chain extender wherein the free-water content of the reactants and the resulting elastomer is less than 0.10 percent based on 100 parts of polyol plus glycol prior to heat curing of the elastomer.

DETAILED DESCRIPTION OF THE INVENTION

Figure 1:
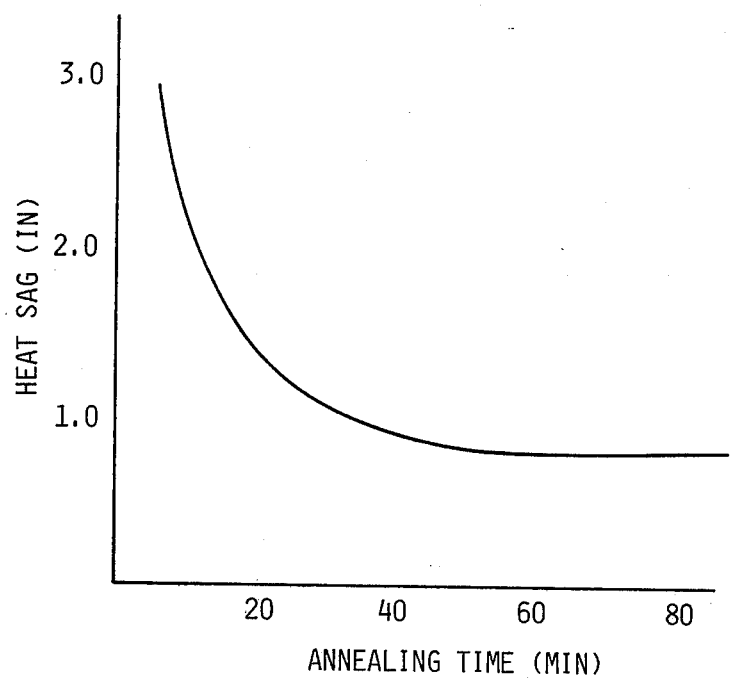
FIG. 1 is a graph of the annealing time vs heat sag of an elastomer at 165° C.

Polyurethane compositions used in making thermally dimensionally stable reaction injection molded polyurethane elastomers are prepared in the usual manner using conventional techniques. It is further well known that microcellular products must be cured at temperatures ranging from 250° F. to 350° F. to have the desired improved physical properties of thermal dimensional stability. The elastomer of the instant invention is prepared employing reaction products which contain less than 0.10 percent free-water content based on 100 parts of polyol plus glycol and the resulting elastomer is protected from the absorption of moisture prior to the curing or annealing step. The microcellular products may be cured at elevated temperatures shortly after demolding to avoid moisture absorption or they may be stored in constant humidity and temperature chambers under very dry conditions to minimize against moisture absorption.

The effect of excess moisture on the elastomers may be noted in foam expansion during annealing or in failure to pass a heat sag test. Either failure may result in an elastomeric product which is sufficiently deformed to be unacceptable. The normal annealing temperatures range from about 120° C. to about 180° C. The preferred temperatures range from about 140° C. to about 165° C. The time required for proper annealing is, of course, dependent upon the temperatures employed. The lower the temperature, the longer the time required for proper annealing of the elastomers. While the time required may range from 30 to 120 minutes, a preferred annealing time ranges from 30 to 60 minutes.

The heat sag test employed was according to ASTM D-3769-79. The test employs a specimen with a 100 mm overhang at a temperature of 125° C. for 60 minutes. Modifications of this test were also employed using a 150 mm overhanging specimen.

The chain extending agent may be chosen from a wide variety of chain extenders which include ethylene glycol, propylene glycol, 1,4-butanediol, glycerine, primary and secondary amines, amino alcohols or mixtures thereof. The preferred chain extender is ethylene glycol. The concentration of chain extender may range from 10 percent to 30 percent based on the total weight of polyol and chain extender. The preferred range is from 15 percent to 25 percent based on the total weight of polyol and chain extender. The concentration of polyol would thus range from 90 percent to 70 percent, preferably from 85 percent to 75 percent based on the total weight of polyol and chain extender.

Although any polyoxyalkylene polyether polyols may be employed, the preferred high molecular weight polyether polyols are those which contain grafted therein vinylic monomers.

The polyols which have incorporated therein the vinylic polymers may be preapred (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092, 4,014,846, 4,093,573, and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. No. 3,652,659 and U.S. Pat. No. Re. 29,014 may be employed in preparing the graft polymer dispersions used in the instant invention, the disclosures of which are incorporated by reference. Representative polyols essentially free from ethylenic unsaturation which may be employed are well known in the art. They are often prepared by the catalytic condensation of an alkylene oxide or mixture of alkylene oxide either simultaneously or sequentially with an organic compound having at least two active hydrogen atoms such as evidenced by U.S. Pat. Nos. 1,922,459; 3,190,927, and 3,346,557, the disclosures of which are incorporated by reference.

Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one -SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethyl-succinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol and sucrose. Also included within the term "polyhydric alcohol" are compounds derived from phenol such as 2,2'-bis(4,4'-hydroxyphenyl)-propane, commonly known as Bisphenol A.

Any suitable polyoxyalkylene polyether polyol may be used such as the polymerization product of an alkylene oxide or of an alkylene oxide with a polyhydric alcohol. Any suitable polyhydric alcohol my be used such as those disclosed above for use in the preparation of the hydroxy-terminated polyeters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology,* Vol. 7, pp. 257–262, published by Interscience Publishers, Inc. (1951) or in U.S. Pat. No. 1,922,459. Those preferred are the ethylene, propylene and butylene oxide adducts of ethylene glycol, propylene, glycol, butylene glycol, glycerol, 1,1,1-trimethylolpropane, 1,1,1-trimethylolethane, 1,2,6-hexanetriol, α-methyl-glucoside, pentaerythritol, sorbitol, 2,2'-(4,4'-hydroxypheyl)propane and sucrose, and mixtures thereof with equivalent weights from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No.3,639,542. Preferred polyhydroxyl-containing phosphorus compounds are prepared from alkylene oxides and acids of phosphorus having a $P_2O_5$ equivalency of from about 72 percent about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylenedianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in preparing the graft polymer dispersions. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(β-chloroethyl) vinylphosphonate, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene, methyl methacrylate and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, di-α-cumyl peroxide, dipropyl peroxide, diisopropyl peroxide, isopropyl-t-butyl peroxide, butyl-t-butyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α-α'-azo-bis(2-methyl) butyronitrile, α,α'-azo-bis(2-methyl) heptonitrile, 1,1'-azo-bis(1-cyclohexane) carbonitrile, dimethyl α,α'-azo-bis(isobutyronitrile), 4,4'-azo-bis(4-cyanopetanoic) acid, azo-bis-(isobutyronitrile), 1-t-amylazo-1-cyanocyclohexane, 2-t-butylazo-2-cyano-4-methoxy-4-methylpentane, 2-t-butylazo-2-cyano-4-methylpentane, 2-(t-butylazo)isobutyronitrile, 2-t-butylazo-2cyanobutane, 1-cyano-1-(t-butylazo)cyclohexane, t-butyl peroxy-2-ethylhexanoate, t-butylperpivalate, 2,5-dimethyl-hexane-2,5-diper-2-ethyl hexoate, t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally, from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840 which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol as disclosed in copending applications Ser. No. 179,136 and Ser. No. 179,137.

The conventional polyurethane foams employed in the present invention are generally prepared by the reaction of a polyoxyalkylene polyether polyol having a graft polymer content of at least 5 parts per 100 parts of polyol at least 3 parts by weight per 100 parts of polyol for high resiliency polyurethane foams with an organic polyisocyanate in the presence of a blowing agent and optionally in the presence of additional polyhydroxyl-containing components, chain-extending agents, catalysts, surface-active agents, stabilizers, dyes, fillers such as milled glass fibers and pigments. Suitable processes for the preparation of cellular polyurethane plastics are disclosed in U.S. Pat. No. Re. 24,514 together with suitable machinery to be used in conjunction therewith. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with a blowing agent to prepare a foam. Alternately, the components may be reacted in a single working step commonly known as the "one-shot" technique of preparing polyurethanes. Low boiling hydrocarbons such as pentane, hexane, heptane, pentene, and heptene; azo compounds such as azohexadydrobenzodinitrile; halogenated hydrocarbons such as dichlorodifluoromethane, trichlorofluoromethane, dichlorodifluoromethane, trichlorofluoromethane, dichlorodifluoroethane, vinylidene, chloride, dichlorofluoromethane, dichloromethane, tricloromethane, dichlorofluoroethane, trichlorotrifluoromethane, hexafluorocyclobutane, and octafluorocyclobutane, may be used as blowing agents.

The organic polyisocyanate employed in the instant invention corresponds to the formula R' (NCO)z wherein R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl)sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 4,4'-cyclohexane diisocyanate, hexahydrotoluene diisocyanate, 1,5-naphthylene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Included within the useable isocyanates are the modifications of the above isocyanates which contain carbodiimide, allophonate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound a determined by the well-known Zerewitinoff test, as described by Kohler in *Journal of the American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

Crude polyisocyanate may also be used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The graft polymer polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Catalysts that are useful in producing resilient polyurethane foams in accordance with this invention invlude:

A. tertiary amines such as triethylene diamine, bis(dimethylamino ethyl)ether, triethylamine, N-methylmorpholine, N-ethylmorpholine, N,N-dimethylbenzylamine, N,N-dimethylethanolamine, and the like;

B. tertiary phosphines, such as, trialkyl phosphines, dialkyl benzyl phosphines, and the like;

C. strong bases such as alkaline and alkali earth metal hydroxides, and phenoxides;

D. acidic metal salts of strong acids such as ferric chloride, stannic chloride, stannous chloride, antimony trichloride, bismuth nitrate and chloride and the like;

E. chelates of various metals such as those obtained from acetylacetone, benzoyl acetone, ethyl acetoacetate and the like;

F. alcoholates and phenolates of various metals such as $Ti(OR)_4$, $Sn(OR)_2$, $(Al(OR)_3$, and the like wherein R is alkyl or aryl and the like;

G. salts of organic acids with a variety of metals such as alkali metals, alkaline earth metals, Al, Sn, Mn, Pb, Co, Ni, and Cu, including, for example, sodium acetate, potassium laurate, calcium hexanoate, stannous acetate, stannous octoate, stannous oleate, lead octoate, metallic dryers such as manganese and cobalt naphthenates, and the like;

H. organic metallic derivatives of tetravalent tin, trivalent and pentavalent arsenic, antimony and bismuth, and metal carbonyls of iron, cobalt and nickel.

The products and process of this invention is explained further by the following examples. The parts given in the examples are by weight unless otherwise indicated. The following abbreviations are employed in the examples:

Polyol A—is a graft polymer dispersion of 20 percent vinyl polymer content, 2:3 acrylonitrile:styrene prepared by the in situ polymerization of a 2:3 weight mixture of acrylonitrile to styrene in a polyol which is a propylene oxide, ethylene oxide and allyl glycidyl ether adduct of a mixture of glycerine and propylene glycol containing a 15 percent ethylene oxide cap and having a hydroxyl number of 33.

Polyol B—is similar to polyol A except the vinylic content is 30, the ratio of acrylonitrile to styrene is 3:1 and the hydroxyl number is 26.

Polyol C—a propylene oxide adduct of ethylene glycol with a hydroxyl number of 540.

Polyol D—a polyoxypropylene glycol with a hydroxyl number of 56.

T-12—dibutyltin dilaurate.

ISONATE 143L—is a carbodiimide modified diphenylmethane diisocyanate manufactured by Upjohn Chemical Corp.

EXAMPLE 1

A microcellular foam was prepared by reacting 80 parts of Polyol A, 20 parts of ethylene glycol and 0.075 part of T-12 catalyst with a prepolymer, consisting of 100 parts of diphenylmethane diisocyanate, 9.7 parts of Polyol C and 2.6 parts of Polyol D, in a mold at a temperature of 63° C. After curing in the mold for 120 seconds, the microcellular foam was removed, cut in sections and heat annealed at 165° C. for various times. Heat sag was then determined as per ASTM D-3769-79, modified. FIG. 1 illustrates the effect of annealing time on heat sag. The total moisture content of Polyol A plus glycol was less than 0.10 percent.

EXAMPLE 2

Figure 2:
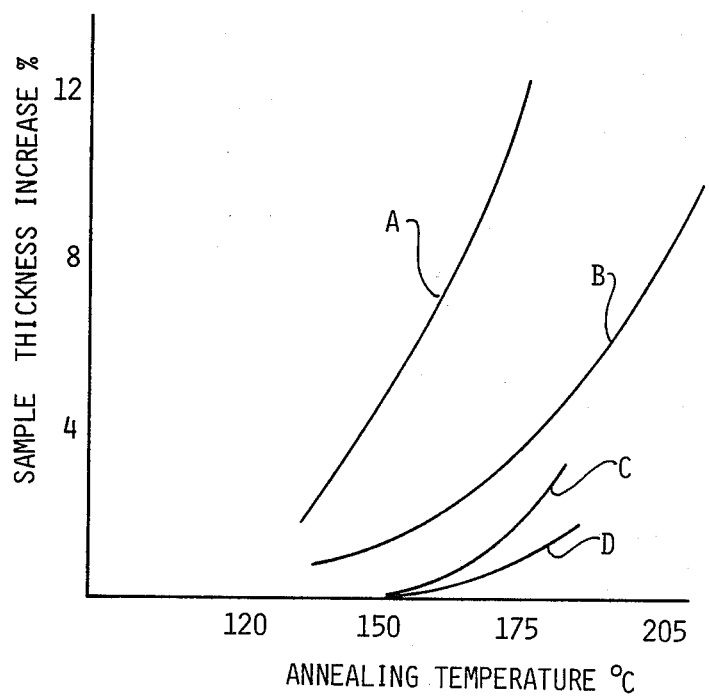
FIG. 2 is a graph of the foam expansion vs temperature of microcellular foams annealed for 60 minutes.

The samples exemplified by curves A and C in FIG. 2 were prepared by reacting 80 parts of Polyol A, 20 parts of ethylene glycol and 0.075 part of T-12 with 99.7 parts of Isonate 143L in a mold at a temperature of 63° C. The water contents of the Examples of curve A were 0.14 percent based on the weight of ethylene glycol, while the water contents of the examples of curve C were <0.04 percent based on the weight of ethylene glycol. The examples exemplified by curves B and D in FIG. 2 were prepared employing the procedure of Example 1. The water content of the examples of curve B was 0.14 percent based on the weight of ethylene glycol while the examples of curve D had a wter content of less than 0.04 percent based on the weight of ethylene glycol. All the samples were annealed for 60 minutes. FIG. 2 illustrates the effect of moisture on the expansion of the microcellular foam upon annealing.

EXAMPLE 3

Figure 3:
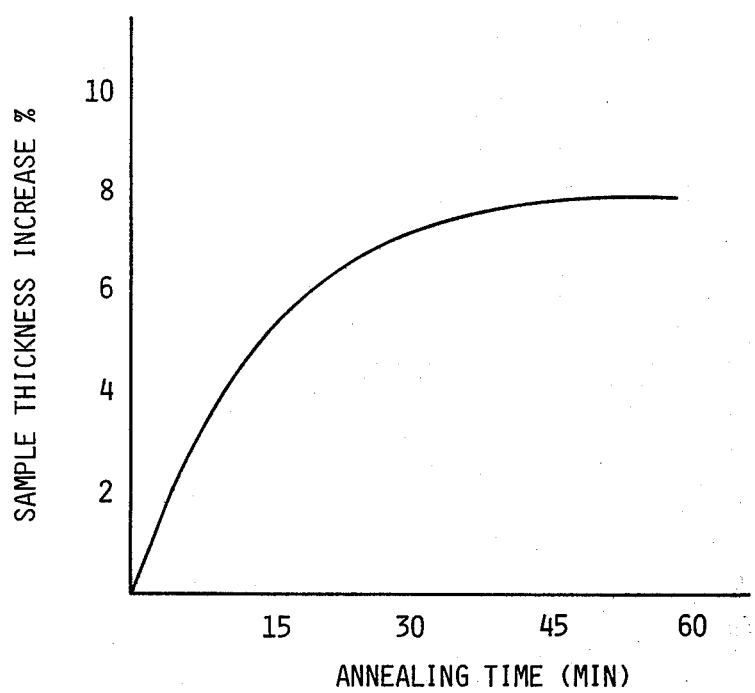
FIG. 3 is a graph of the foam expansion vs time of a microcellular foam at 165° C.

A microcellular foam was prepared employing the composition and procedure of Example 2 in curve A. Various samples were annealed at 165° C. and the expansion of the foam was determined at various times as shown in FIG. 3.

EXAMPLES 4-7

The isocyanate at a temperature of about 38° C. and the polyol, ethylene, and T-12 catalyst at a temperature of 50° C. were fed through a mixing head, in the proportions indicated below, into a mold. The mold was conditioned at a temperature of 65° C. The reaction mass was allowed to cure in the mold for 120 seconds. The microcellular foam was then removed from the mold and cured at the indicated temperatures and times. The physical properties obtained are shown in Table I below.

TABLE I

| | Examples | | | |
|---|---|---|---|---|
| | 4 | 5 | 6 | 7 |
| Composition, pbw | | | | |
| Polyol A | 80 | 80 | 80 | 80 |
| Ethylene glycol | 20 | 20 | 20 | 20 |
| T-12 | 0.075 | 0.075 | 0.075 | 0.075 |
| ISONATE 143L | 99.7 | 99.7 | 99.7 | 99.7 |
| Index | 100 | 100 | 100 | 100 |
| Post Cure Temp., °C. | NO | 121 | 165 | 165 |
| Post Cure Time, min. | NO | 60 | 30 | 60 |
| Physical Properties | | | | |
| Density, pcf. | 68.0 | 67.5 | 69.7 | 67.9 |
| Tensile, psi. | 4175 | 4810 | 4755 | 4668 |
| Elongation, % | 62 | 155 | 150 | 165 |
| Graves Tear, pi. | 839 | 927 | 885 | 891 |
| Shore "D" Hardness | 59/59 | 60/60 | 60/60 | 60/60 |
| 121° C. Heat Sag, in. | — | 0.20 | 0.20 | 0.10 |
| Flexibility Modulus, K psi. | | | | |
| −20° F. | 200.1 | 171.6 | 164.1 | 169.7 |
| 72° F. | 89.8 | 87.7 | 86.5 | 89.8 |
| 158° F. | 47.9 | 49.8 | 54.2 | 55.1 |
| Ratio −20° F./158° F. | 4.19 | 3.45 | 3.04 | 3.08 |
| Notched IZOD Impact, ft-lb/in | 5.6 | 11.1 | 10.3 | 10.3 |
| 165° C. Heat Sag, in. | >3 | >3 | 1.44 | 0.80 |
| Coefficient of Thermal Expansion in/in, F. $\times 10^{-6}$ | — | 75 | 72 | 70 |

EXAMPLES 8-11

The procedure of Examples 1-6 was followed employing the following composition resulting in the physical properties listed below.

TABLE II

| | Example | | | |
|---|---|---|---|---|
| | 8 | 9 | 10 | 11 |
| Composition, pbw | | | | |
| Polyol A | 0 | 80 | 80 | 80 |
| Ethylene Glycol | 20 | 20 | 20 | 20 |
| T-12 | 0.075 | 0.075 | 0.075 | 0.075 |
| Milled Glass, % | 15 | 15 | 15 | 15 |
| ISONATE 143L/100 Resin | 73.9 | 73.9 | 73.9 | 73.9 |
| Post Cure Temperature, °C | 121 | 121 | 165 | 165 |
| Flow Direction | Parallel | Perpendicular | Parallel | Perpendicular |
| Physical Properties | | | | |
| Density, pcf. | 78.6 | 78.6 | 78.6 | 78.6 |
| Tensile, psi. | 4500 | 4010 | 5780 | 5550 |
| Elongation, % | 25 | 25 | 50 | 50 |
| Graves Tear, pi. | 573 | 526 | 880 | 846 |
| Shore "D" Hardness | 70/69 | 70/69 | 60/69 | 70/69 |
| 121° C. Heat Sag, inches | 0.20 | 0.28 | 0.10 | 0.10 |
| Flexibility Modulus × $10^3$ | | | | |
| −20° F. | 408.4 | 247.5 | 258.3 | 236.9 |
| 72° F. | 248.5 | 170.1 | 217.1 | 175.9 |
| 158° F. | 100.8 | 69.5 | 132.1 | 99.8 |
| Ratio −20° F./158° F. | 4.05 | 3.56 | 1.95 | 2.37 |
| Notched IZOD Impact ft-lb/in | 4.70 | 4.50 | 7.3 | 6.0 |
| Coefficient of Thermal Expansion in/in, °F., $10^{-6}$ | 37 | 69 | 40 | 67 |
| 165° C. Heat Sag, inches | — | — | 0.34 | 0.61 |

EXAMPLES 12-15

The procedure employed was similar to that of Examples 1-6 with the compositions and resulting properties as found in Table III.

TABLE III

| | Example | | | |
|---|---|---|---|---|
| | 12 | 13 | 14 | 15 |
| Composition, pbw | | | | |
| Polyol A | 80 | 80 | 80 | 80 |
| Ethylene Glycol | 20 | 20 | 20 | 20 |
| T-12 | 0.075 | 0.075 | 0.075 | 0.075 |
| Milled Glass, % | 25 | 25 | 25 | 25 |
| ISONATE 143L/100 Resin | 59.8 | 59.8 | 59.8 | 59.8 |
| Post Cure Temperature, °C. | 121 | 121 | 165 | 165 |
| Flow Direction | Parallel | Perpendicular | Parallel | Perpendicular |
| Physical Properties | | | | |
| Density, pcf. | 83.2 | 83.2 | 83.2 | 83.2 |
| Tensile, psi. | 6040 | 5400 | 6730 | 6000 |
| Elongation, % | 20 | 20 | 20 | 20 |
| Graves Tear, pi. | 740 | 653 | 741 | 702 |
| Shore "D" Hardness | 72/72 | 72/72 | 72/72 | 72/72 |
| 121° F. Heat Sag, inches | 0.20 | 0.20 | 0.03 | 0.06 |
| Flexibility Modulus × $10^3$ | | | | |
| −20° F. | 425.5 | 300.1 | 404.7 | 295.3 |
| 72° F. | 348.4 | 206.5 | 355.4 | 208.3 |
| 158° F. | 156.9 | 101.1 | 201.1 | 116.8 |
| Ratio −20° F./158° F. | 2.71 | 2.97 | 2.01 | 2.53 |
| Shrinkage, % | 0.35 | 1.10 | 0.35 | 1.10 |
| Notched IZOD Impact ft-lb/in | 3.70 | 3.50 | 6.10 | 5.70 |
| Coefficient of Thermal Expansion in/in, °F., $10^{-6}$ | 32 | 69 | 31 | 67 |
| 165° C. Heat Sag, inches | 1.21 | 2.37 | 0.15 | 0.53 |

EXAMPLES 16-20

The procedures employed were similar to those employed in Examples 1-6 with the composition and resulting physical properties as listed in Table IV. All of the products were annealed at 165° C. for 60 minutes.

TABLE IV

| | Examples | | | | |
|---|---|---|---|---|---|
| | 16 | 17 | 18 | 19 | 20 |
| Formulation, pbw. | | | | | |
| Polyol B | 80 | | | 80 | 80 |
| Ethylene glycol | 20 | | | 20 | 20 |
| T12 | 0.075 | | | 0.10 | 0.13 |
| ISONATE 143/100 Resin | 99.7 | 102.6 | 105.6 | 102.6 | 102.6 |
| Index | 100 | 102 | 105 | 102 | 102 |
| Physical Properties | | | | | |
| Density, pcf. | 62.8 | 61.7 | 63.8 | 64.9 | 63.6 |
| Tensile, psi. | 4368 | 4170 | 4403 | 4623 | 4730 |
| Elongation, % | 63 | 55 | 53 | 90 | 85 |
| Graves Tear, pi. | 742 | 676 | 741 | 833 | 941 |
| Shore "D" Hardness | 63/62 | 61/60 | 62/61 | 65/63 | 66/65 |
| 121° C. Heat Sag, in. | 0.29 | 0.23 | 0.24 | 0.22 | 0.14 |
| Flexibility Modulus, | | | | | |

TABLE IV-continued

|  | Examples | | | | |
| --- | --- | --- | --- | --- | --- |
|  | 16 | 17 | 18 | 19 | 20 |
| × 10³ |  |  |  |  |  |
| −20° F. | 210.6 | 209.0 | 223.5 | 225.2 | 231.1 |
| 72° F. | 118.5 | 119.2 | 128.4 | 129.7 | 135.5 |
| 158° F. | 57.7 | 57.9 | 61.7 | 58.7 | 68.6 |
| Ratio −20° F./158° F. | 3.65 | 3.61 | 3.62 | 3.83 | 3.37 |

The embodiments of the invention in which an exclusive privilege or property is claimed are defined as follows:

1. A dimensionally stable reaction injection molded polyurethane elastomer comprising the reaction product of an organic polyisocyanate, a polyoxyalkylene polyether polyol, a blowing agent and ethylene glycol wherein said elastomer contains less than 0.10 percent free water prior to curing at 120° C. to 210° C.

2. The elastomer of claim 1 wherein said polyol is a graft polymer dispersion prepared by the in situ free-radical polymerization of an ethylenically unsaturated monomer or monomers in a polyol.

3. The elastomer of claim 1 wherein the concentration of said glycol is from 15 percent to 25 percent based on the total weight of polyol and ethylene glycol.

4. The elastomer of claim 1 wherein said polyisocyanate is carbodiimide modified diphenylmethane diisocyanate.

5. The elastomer of claim 2 wherein said unsaturated monomer is selected from the group consisting of acrylonitrile, styrene and methyl methacrylate.

6. A process for preparing a dimensionally stable reaction injection molded polyurethane elastomer which comprises (a) reacting an organic polyisocyanate, a polyoxyalkylene polyether polyol, a blowing agent and ethylene glycol, and (b) curing said elastomer at temperatures from 120° C. to 210° C., the improvement comprises employing a combination of said polyol and glycol in step (a) which contain a free water content of less than 0.10 percent.

7. The process of claim 6 wherein said polyol is a graft polymer dispersion prepared by the in situ free-radical polymerization of an ethylenically unsaturated monomer or monomers in a polyol.

8. The process of claim 6 wherein the concentration of said glycol is from 15 percent to 25 percent based on the total weight of polyol and ethylene glycol.

9. The process of claim 6 wherein said polyisocyanate is carbodiimide modified diphenylmethane diisocyanate.

10. The process of claim 6 wherein said unsaturated monomer is selected from the group consisting of acrylonitrile, styrene and methyl methacrylate.

* * * * *